United States Patent [19]
Vogelgesang et al.

[11] Patent Number: 4,939,715
[45] Date of Patent: Jul. 3, 1990

[54] TAPE SCANNING APPARATUS

[75] Inventors: Peter J. Vogelgesang, Roseville; Wayne M. Wirth, North St. Paul, both of Minn.

[73] Assignee: Minnesota Mining and Manufacturing Company, St. Paul, Minn.

[21] Appl. No.: 288,302

[22] Filed: Dec. 22, 1988

Related U.S. Application Data

[63] Continuation-in-part of Ser. No. 138,860, Dec. 29, 1987, abandoned.

[51] Int. Cl.⁵ ................. G11B 5/008; G11B 15/00
[52] U.S. Cl. ............................ 360/93; 360/132; 360/137; 369/97
[58] Field of Search .............. 369/97; 360/132, 93, 360/134, 136; 242/55.19 A, 55.21

[56] References Cited

U.S. PATENT DOCUMENTS

| | | | |
|---|---|---|---|
| 4,168,506 | 9/1979 | Carsover | 346/100 |
| 4,293,882 | 10/1981 | Moris | 360/93 |
| 4,367,850 | 1/1983 | Moris | 242/55.19 A |
| 4,393,423 | 7/1983 | Moris | 360/93 |
| 4,394,989 | 7/1983 | Moris | 242/95.19 A |
| 4,495,609 | 1/1985 | Russell | 369/44 |
| 4,525,828 | 6/1985 | Higashiyama et al. | 369/111 |
| 4,633,455 | 12/1986 | Hudson | 369/45 |
| 4,661,941 | 4/1987 | Bell et al. | 369/111 |
| 4,669,070 | 5/1987 | Bell | 369/44 |
| 4,686,597 | 8/1987 | Johnston | 360/130.23 |
| 4,764,826 | 8/1988 | Estes | 360/132 X |

FOREIGN PATENT DOCUMENTS

2167202 5/1986 United Kingdom .

OTHER PUBLICATIONS

IBM Tech. Bell, vol. 15, No. 6, Nov. 72, pp. 1790-1791, Juliana, Jr. "Rotating Head Magneto-Optic Station".
"Let There be Light"; Onosko, Creative Computing, vol 11, No. 9 Sep. 1985, pp. 43-49.
"Optical Overview, What's Coming in CD-ROMs and WORMS"; Helliwell, PC Magazine, Oct. 14, 1986, pp. 149-154, 159-162, 164.
"Optical 3½-Truck Drive adds Erasability"; Warren, Mini-Micro Systems, Jul. 1985, pp. 133-134, 137-138, 141.
"Magneto-Optics Combines Erasability and High Density Storage"; Ohm Electronic Design, Jul. 11, 1985, pp. 93-98, 100.

*Primary Examiner*—Aristotelis M. Psitos
*Attorney, Agent, or Firm*—Kinney & Lange

[57] ABSTRACT

An apparatus for reading and recording information on a tape record medium has the tape wound and advanced along a helical path on the outer cylindrical surface of the drum. A system for writing and reading information on the tape is positioned entirely on the outside of the drum and is stationary relative to the rotation of the drum and movement of the tape thereon. Tape is supplied to the helical path on the drum by one or more tape reels rotatably mounted within the drum and aligned coaxially with the rotational axis of the drum. The drum and tape thereon are rotated at a high rate relative to the stationary read/write system, and the tape is advanced along the helical path at a relative slow rate. The drum and tape thereon are configured in the form of a cartridge, removeable as a unit from the optical system.

33 Claims, 6 Drawing Sheets

TAPE SCANNING APPARATUS

This application is a continuation-in-part of U.S. patent application Ser. No. 138,860, filed Dec. 29, 1987, now abandoned.

BACKGROUND OF THE INVENTION

1. Field of the Invention

The present invention relates to helical scanning tape recording methods and apparatus therefor.

2. Description of the Prior Art

A helical scan approach to magnetic recording is now used universally in the videotape recording industry, and the same approach has also been used for high data rate digital recorders. In a typical helical scan recorder for video tape, the recording tape is taken from a supply reel, guided onto a rotating head wheel, wrapped partially around the head wheel, and then guided off the head wheel onto a take-up reel. Commonly, the supply and take-up reels are mounted and supported in a form known as a video tape cassette. The path of the tape as wrapped around the head wheel is skewed, thus following a helical path on the periphery of the head wheel (giving rise to the term of art "helical scan"). One or more magnetic heads protrude slightly from the head wheel and rotate with the head wheel to engage the magnetic tape along a diagonal path on the tape from edge to edge and along a length of the tape equal approximately to the amount of wrap of the tape on the head wheel. For each pass of the magnetic head across the tape (as the head wheel rotates relative to the tape), the tape advances slightly along the helical path so that each subsequent diagonal path on the tape traced by the magnetic head lies adjacent to the previous diagonal path. A significant advantage realized by helical recording techniques is the attainment of a head-to-tape speed of hundreds of inches per second, allowing very high frequencies to be recorded. Another advantage of a helical scan system is to allow long uninterrupted lines ("tracks") of information relative to the width of the tape while at the same time maximizing the area of the tape covered with recording tracks.

The use of helical scanning is especially useful where multiple tracks are recorded simultaneously in order to achieve a high data transfer rate. While this method lends itself to scanning formats in which as many as four heads are in contact with the magnetic tape simultaneously, the difficulty of making electrical contact with rotating heads (either by rings and brushes, or by rotating transformers) limit the number of heads which can be practically employed. This in turn limits the maximum data transfer rate obtainable with helical scanning of magnetic tape. In addition, with typical track widths of 0.001 inch width or less, the difficulties of aligning multiple heads on a rotating head wheel are formidable.

Recent developments in information storage technology have resulted in a variety of techniques of recording and reading information by optical or magneto-optic means. At present, optical recording technology is being utilized in the consumer market for distribution of pre-recorded television programming (optical video disk) and pre-recorded high fidelity sound (compact disk). These applications demonstrate the reliability of optical recording techniques. In addition, applications are emerging for the write-once optical disks by commercial and industrial users for storage of digital data, including the storage of digitized images. Commercial introduction of erasable media, such as magneto-optic disks, will further enhance the utilization of optical recording systems and will make possible the storage of large numbers of digitized images within relatively small disk drives.

The principal virtues of optical disk recording are high storage density (approximately $2 \times 10^8$ bits per square inch), high speed random access to large data stores, and a non-contact (i.e., non-wearing) machine-media interface which is mechanically forgiving. These virtues translate to digitized image storage capabilities which combine high capacity, small size, and low cost.

While optical disk recording provides unprecedented storage density and access to data, the surface area of a disk is limited by the constraint of a convenient and manageable disk diameter. Combinations of multiple disks in a "juke box" format circumvents this constraint to a certain extent, but is an expensive solution to the problem.

Optical recording on a tape medium, on the other hand, provides a much greater surface area than on a manageable disk, since the area of a tape is limited only by the size of the reel on which it is wound. Of course, use of a tape for data storage provides serial access to the data and may be limited to applications in which access time is not important or where the data is always handled in continuous, real time data streams. Numerous applications exist for this kind of data handling, including long-term data storage and back-up for disks. Digitized visual images generally generate continuous data streams because digital values are generated from analog image scanning devices.

Attempts have been made to combine the advantages of helical scanning with optical tape. In such arrangements, the tape follows a helical path around a head wheel, with the rotating magnetic head of a helical magnetic scanner replaced by rotating some or all optical components of a laser-driven optical scanning system. The head wheel, containing certain optical components, has in it a transparent window or opening to allow the laser beam to reach the tape from within the head wheel. Examples of such schemes are seen in Bell et al. U.S. Pat. No. 4,661,941, Hudson U.S. Pat. No. 4,633,455 and Higashiyama U.S. Pat. No. 4,525,828. These patents show optical tape recording systems in which the beam from an external laser is projected into the interior of a head wheel along the axis of rotation of the head wheel with an assortment of mirrors, beamsplitters and the like, some of which rotate with the head wheel to produce the necessary optical scan. As illustrated by the complex optical arrangements shown in these patents, rotating optics are not easily implemented. In addition, since the read/write laser beam reaches the tape from inside the head wheel, the data borne on the tape must be accessed through or read off of that side of the tape which contacts the surface of the rotating head wheel, which has a surface velocity greatly in excess of the surface velocity of the tape. The surface of the tape in contact with the head wheel, which is usually the critical surface of the tape for information transfer purposes, is thus subject to possible damage and data loss through contact with the high speed head wheel.

Although helical scanning of magnetic tape is now a standard procedure (using rotating heads), the ability to quickly transfer data is limited because of physical constraints and alignment problems, as discussed above. The ability to obtain a higher data transfer rate for magnetic tape using helical scanning is desired, however, since magnetic tape is easy to handle, involves well-known recording technology, and is a relatively inexpensive medium. In addition, the data recording and retrieval heads for magnetic tapes are relatively inexpensive, compared to optics.

SUMMARY OF THE INVENTION

The present invention provides an apparatus and method for reading and recording on a tape recording medium. The apparatus of the present invention includes a drum with tape helically wound around the outside of the drum. Data detecting means are provided for scanning an outer side of the tape which is wound on the drum, and the apparatus includes means for rotating the drum and tape wound thereon past the data detecting means. In a preferred embodiment, means are also provided for recording information on the tape wound on the helical path.

Preferably tape is supplied from within the rotating drum itself, where a tape supply includes a tape supply reel and tape take-up reel, both of which are rotatably mounted relative to the drum, and preferably coaxially with the rotational axis of the drum. In another embodiment of the apparatus of the present invention, the tape is formed as an endless loop of tape, supplied from a single pack of coiled tape within the drum. Preferably, the coiled pack of tape is positioned coaxially with the rotatable axis of the drum. In both of these embodiments, the drum is provided with means for advancing the tape along a helical path defined on the outer cylindrical surface of the drum. Preferably, the drum, tape wound thereon, tape supply and related tape handling components mounted on the drum comprise a tape drum assembly which, as a unit, is disengageable from the means for rotating the drum and interchangeable with other similar tape drum assemblies for rapid and simple replacement of the tape in relation to the data detecting means.

In an preferred embodiment, the cylindrical outer surface of the drum has a longitudinal gap therein for permitting the tape to move between the tape in the drum and the helical path about the cylindrical outer surface of the drum. The helical path extends in an arc less than 360° about the cylindrical outer surface of the drum, thereby creating a break in the tape and the information thereon presented to the data detecting means during each rotation of the drum. Buffer means are provided for accommodating this information break during each revolution of the drum and for generating a relatively constant and uninterrupted stream of output signals based on the information detected on the tape. A sensor is provided for determining the rotational position of the drum relative to the data detecting means.

Preferably, the data detecting means includes a plurality of tape reading devices, each device thus tracking a different helical track on the tape as it is rotated past the device. The tape reading devices are spaced apart about the cylindrical outer surface of the drum, in generally equal arcs, while the helical path on a cylindrical outer surface of the drum extends about the drum in an arc greater in degrees than each of the arcs between adjacent tape reading devices.

While any tape record medium will work, in a preferred embodiment magnetic tape is used and the data detecting means includes at least one magnetic head which scans the magnetic tape wound around the drum. Each magnetic head is external to and fixed in position relative to the rotating drum and the magnetic tape thereon. Either "contact heads" (where the magnetic head physically engages the tape) or "flying heads" (where the magnetic head is spaced from the tape by a few thousandths of an inch) may be used.

When a contact head is used, effective contact must be made between the magnetic head and magnetic tape, and means are provided for permitting the head to press the tape radially toward the central axis of the drum to permit full contact of the poles of the head with the tape. Preferably, the tape is permitted to be pressed radially inwardly on the drum into a groove formed around the cylindrical outer surface of the drum. The groove extends in a plane perpendicular to the central axis of the drum in a line within the helical path. In a preferred embodiment wherein a plurality of magnetic heads are in contact with the magnetic tape, the heads are all aligned in a common plane which is perpendicular to the central axis of the drum, and also coplaner with the groove.

The method of the present invention for retrieving information from a tape includes the steps of aligning the tape in helical path about an axis, rotating the tape about that axis and scanning on a side of the tape opposite the axis to detect information thereon as the tape is rotated. For placing information on the tape, the method includes the step of recording information on the side of the tape opposite the axis as the tape is rotated. When the tape is magnetic tape and the scanning thereof is performed by a contact magnetic head, the inventive method includes the additional step of contacting the tape with the magnetic head to urge the tape radially inwardly from the helical path and toward the axis. Other steps in preferred embodiments of the inventive method include advancing the tape along the helical path as the tape is rotated, and supplying tape to the helical path from a tape supply within the helical path.

DETAILED DESCRIPTION OF THE PREFERRED EMBODIMENTS

While it is contemplated that any suitable tape record medium can be used in connection with the apparatus and method of the present invention, the discussion below will provide examples of the invention configured for two types of the tape record medium, namely optical tape and magnetic tape. With respect to either tape medium, the tape itself is handled in the same general manner, with the primary differences being concerned with the manner in which the information is recorded on or retrieved from the tape. With optical tape, no actual contact between the information detection and retrieval system and the tape itself is necessary; information is recorded on or retrieved from the tape by a beam of radiant energy focused on the tape. With magnetic tape, the use of "flying magnetic heads" does not require contact between tape and head, but the use of "contact magnetic head" does. In the latter case, the magnetic head must physically engage the tape medium in order to transfer data to and from the tape.

Figure 1:
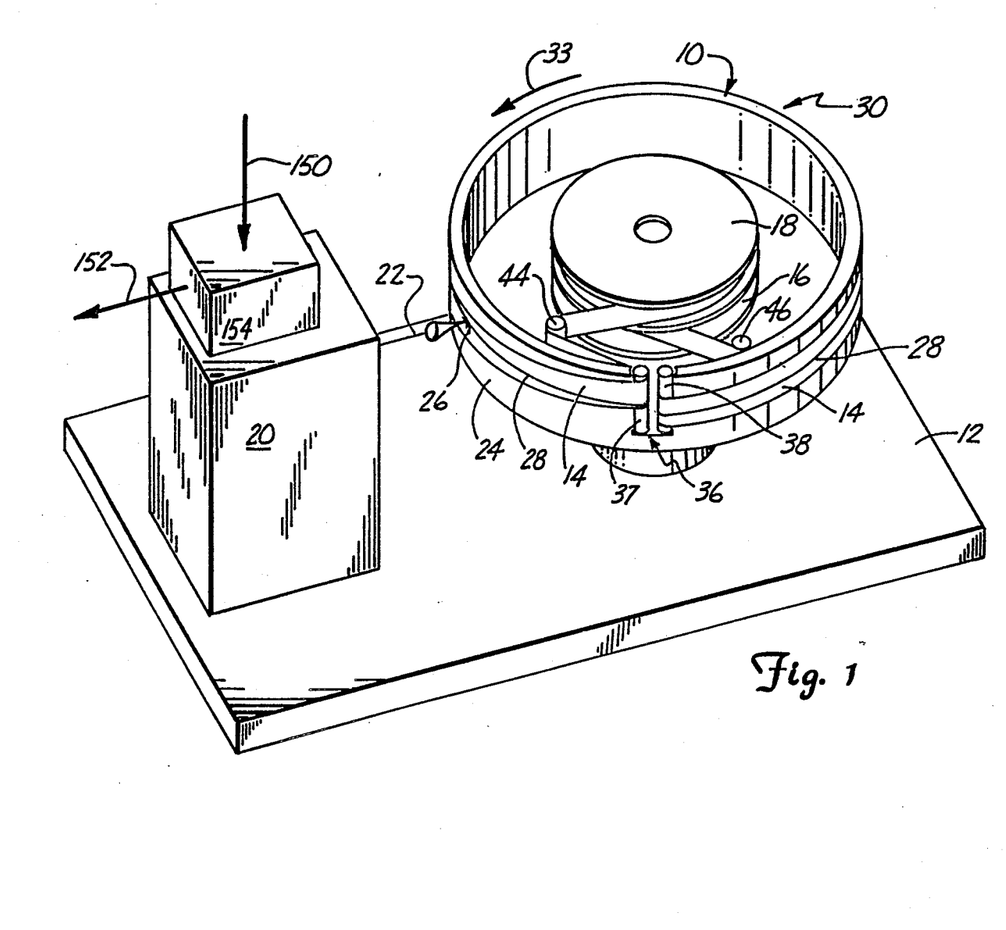
FIG. 1 (Sheet 1) is a schematic isometric representation of the present invention illustrating an optically readable tape mounted in a helical path on a rotatable drum and a non-rotating read/write optical assembly positioned external to the drum.
Figure 2:
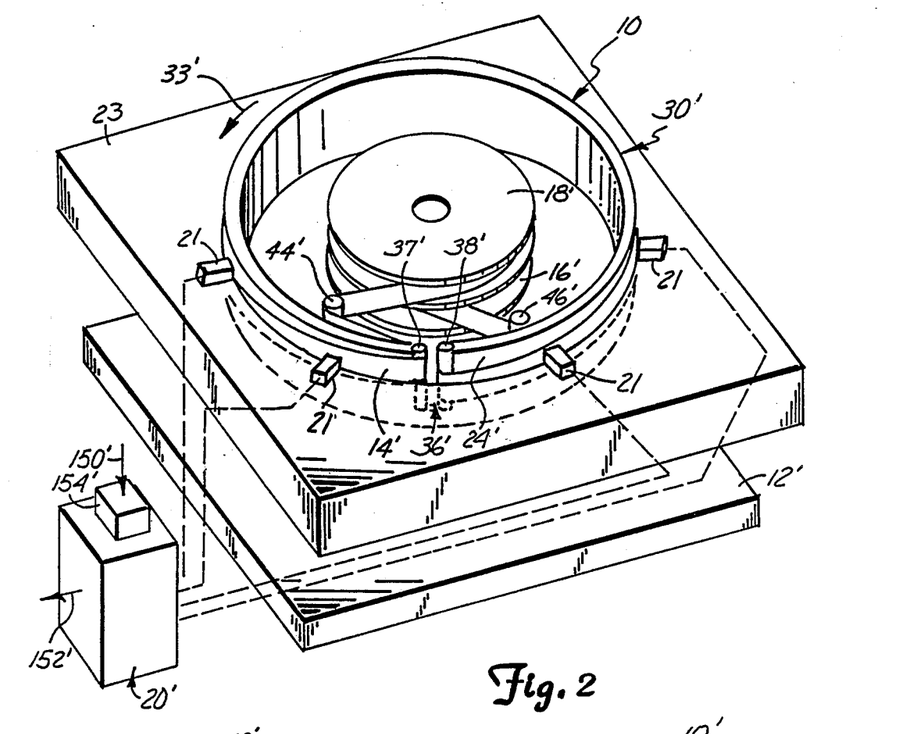
FIG. 2 (Sheet 2) is a schematic isometric representation of the present invention illustrating a magnetic readable tape mounted in a helical path on a rotatable drum, with a plurality of non-rotating read/write magnetic heads positioned external to the drum.

FIG. 1 shows the apparatus of the present invention in a proposed arrangment for use with optical tape, while FIG. 2 shows a proposed arrangement for use with magnetic tape. As seen in FIG. 1, a tape drum 10 is rotatably mounted with respect to a base 12. A tape record medium 14 is wrapped in a helical path around the outside of the tape drum 10. Tape supply and take-up reels 16 and 18, respectively, are contained inside the tape drum 10. Preferably, the reels 16 and 18 are rotatable with respect to the tape drum 10 and coaxially aligned with each other, and also with the rotational axis of the tape drum 10. In FIG. 2, the components of the apparatus which correspond to those illustrated in FIG. 1 are referenced by the same reference characters with a prime added (e.g., tape drum 10', base 12', tape record medium 14', etc.).

In a first embodiment of the present invention, the tape record medium 14 is "optical tape". Such tape consists of a ribbon of substrate material capable of providing a suitably smooth optical surface. The substrate may be reactive to laser light; or the substrate may be coated with a second substance or may have additional layers which are reactive to light. This reaction is employed during the tape recording operation. The effect of the reaction or some other pre-recorded condition of the tape is sensed during tape playback by some characteristic of reflected or transmitted light (e.g., the magnitude, color (wavelength), phase or polarization of light). It is contemplated that the present invention will function with any kind of tape capable of interacting with a focused beam of radiant energy.

As seen in FIG. 1, the present invention includes a tape reading/writing assembly 20, external of the tape drum 10 and fixed with respect to the base 12. For reading and writing on optical tape, the read/write assembly 20 generates, in a conventional manner, a laser beam 22, which is directed to focus on an outer cylindrical surface 24 of the tape drum 10 at point 26, and the beam 22 is essentially perpendicular to the cylindrical outer surface 24 of the tape drum 10 at that point.

As the tape drum 10 is rotated relative to base 12 and read/write assembly 20, the point 26 traces a circular path 28 on the cylindrical outer surface 24 of the tape drum 10. However, because the tape 14 follows a helical path about the tape drum 10, the point 26 traces a diagonal path on the tape 14 (i.e., helical scanning of the tape).

In another embodiment of the present invention, using magnetic tape, a tape reading/writing assembly 20', external of the tape drum 10' is provided. For reading and writing on magnetic tape 14', the read/write assembly 20' includes one or more magnetic heads 21 which operate in a conventional manner with respect to the magnetic tape to transfer information to and from the tape. The magnetic heads 21 are mounted in a fixed manner with respect to the rotating tape drum 10', and the poles of the magnetic head 21 are aligned essentially perpendicular to the cylindrical outer surface 24' of the tape drum 10'.

As the tape drum 10' is rotated relative to the base 12' and magnetic head 21 of the read/write assembly 20', the poles of the magnetic head 21 trace a circular path on the cylindrical outer surface 24' of the tape drum 10'. However, because the magnetic tape 14' follows a helical path about the tape drum 10', the poles of the magnetic head 21 trace a diagonal path on the tape 14' (i.e., helical scanning of the tape). Preferably, when multiple magnetic heads 21 are employed, they are mounted on a flat plate or surface 23, so that the magnetic heads 21 are all coplanar with respect to the tape drum 10'.

Figure 3:
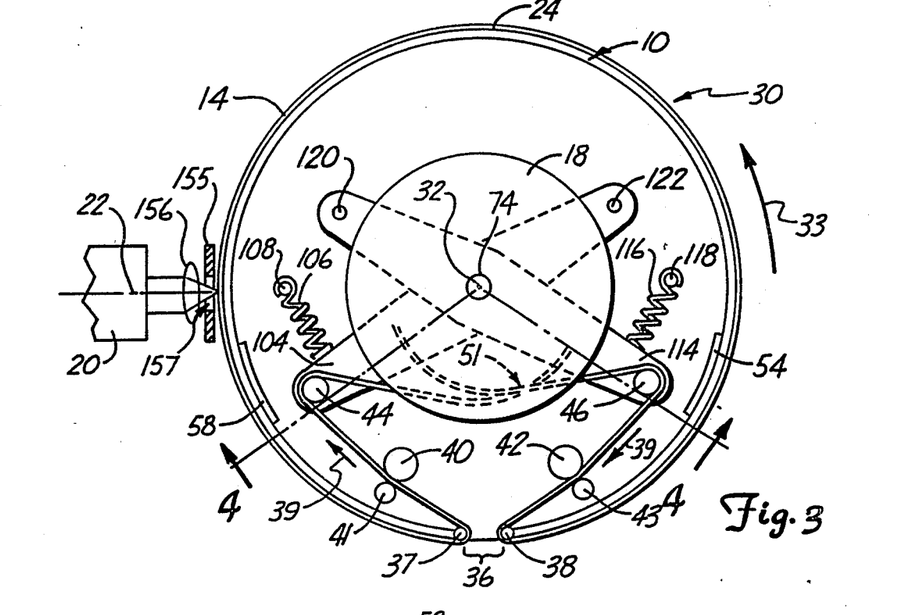
FIG. 3 (Sheet 3) is a schematic top view of the rotatable drum of the present invention showing the tape path originating and terminating in concentrically mounted supply and rewind reels.

FIG. 3 is a top view schematic representation of the tape drum 10 of FIG. 1, showing the tape path and other elements that relate to tape handling. For optical tape handling, a tape drum assembly 30 carries the optically readable tape and is located adjacent to the read/write assembly 20, which contains the optical elements necessary to read or write information on the tape 14. For magnetic tape handling, a tape drum assembly 30' is the same as with optical tape (as seen in FIG. 3), except that a magnetic head 21 is positioned adjacent the rotating drum instead of having a laser beam focused on the drum.

Other than the means for reading or writing on the tape, the tape drum assembly is configured essentially the same for handling either optical or magnetic tape. The discussion to follow regarding the features of FIGS. 3–6, 8 and 9 is applicable to either media unless otherwise noted.

The tape drum assembly 30 rotates at a generally fixed speed around its axis of rotation 32, being driven by a motor 34 (FIG. 4) in direction indicated by arrow 33. No components of the read/write assembly 20 rotate with the drum assembly 30 in order to record on or retrieve data from the tape 14. The tape 14, capable of carrying information, not only extends around the outer periphery of the tape drum 10 (on its cylindrical outer surface 24) but also extends into the interior of tape drum 10 through an opening or slot 36 therein. The opening 36 is a cutout in the tape drum 10, creating a gap in its cylindrical outer surface 24, and is provided to permit passage of the tape 14 between the helical path and the tape supply reel 16 and tape take-up reel 18 rotably mounted on the tape drum 10.

Roller guides 37 and 38 are provided at the edges of the opening 36 in the tape drum 10 in order to reduce friction and avoid damage to the tape 14 as it enters and exits the tape drum 10 and helical path thereon. The roller guides 37 and 38 are preferably rotatably mounted with respect to the tape drum 10.

As the tape drum assembly 30 rotates relative to the read/write assembly 20, the tape 14 is advanced relative to the cylindrical outer surface 24 of the tape drum 10, in direction indicated by arrows 33 and 39 (FIG. 3). Within the tape drum 10, along that portion of the tape path between opening 36 and supply reel 16, the tape 14 passes between a tape advance capstan 40 and associated pinch roller 41. When a tape advance relative to the tape drum 10 is desired, the advance capstan 40 is rotatably driven by a motor in the conventional manner to advance the tape 14 along about the helical path on the tape drum 10 and to and from the supply and take-up reels 16 and 18. A tape rewind capstan 42 and associated pinch roller 43 are also provided on the tape path within the tape drum 10, along that portion of the tape path between opening 36 and take-up reel 18. The tape rewind capstan 42 is driven by its own motor or by mechanical connection to the drive motor for the tape advance capstan 40, and provides one means for reversing the direction of tape advance (in direction opposite to that of arrows 33 and 39).

Spring-loaded dancer rollers 44 and 46 provide the tension required to keep the tape 14 in intimate contact with the outer cylindrical surface 24 of the tape drum 10. As seen in FIG. 3, dancer roller 44 defines the tape path between the take-up reel 18 and advance capstan 40, while dancer roller 46 defines the tape path between the supply reel 16 and rewind capstan 42. Preferably, the dancer rollers 44 and 46 and other tape handling components (e.g., capstans 40 and 41, pinch rollers 42 and 43 and roller guides 37 and 38) are tilted slightly off of perpendicular (relative to the tape path from the reels) to provide smooth transitions for the tape 14 between the reels 16 and 18 and the helical path on the outer cylindrical surface 24 of the tape drum 10.

Figure 4:
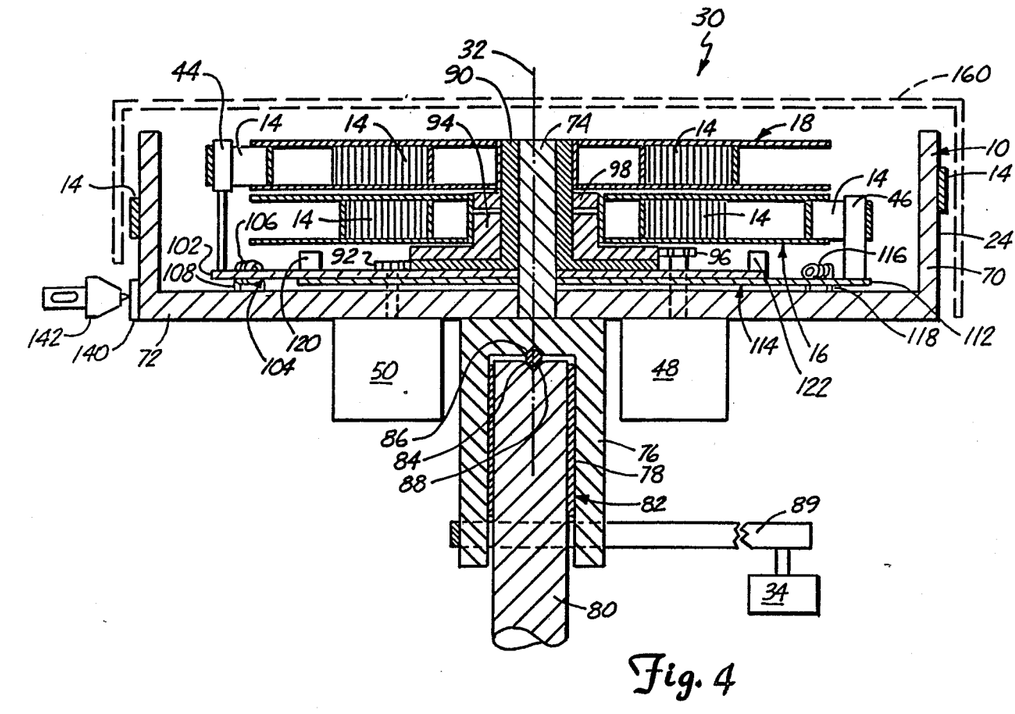
FIG. 4 (Sheet 4) is a cross-sectional view as taken along the line 3—3 in FIG. 3.

The supply reel 16 is rotatably driven by a motor 48, and the take-up reel 18 is rotatably driven by a motor 50 (FIG. 4). Separate motors are provided for the supply and take-up reels, since the rotational speeds of the supply and take-up reels will vary depending on how much tape exists on each. Because of the criss-cross overlapping (as at 51 in FIG. 3) of tape 14 within the tape drum 10, the supply and take-up reels both rotate in the same direction.

Figure 5:
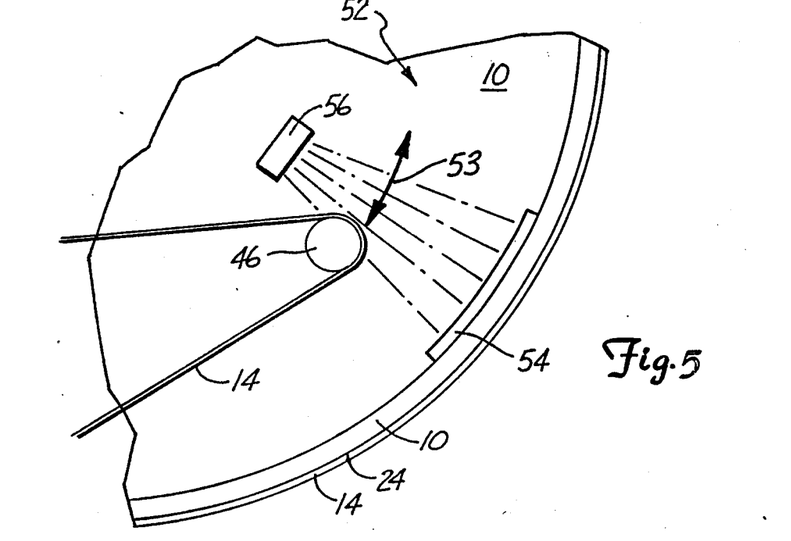
FIG. 5 (Sheet 3) is an enlarged, schematic top view illustrating the photosensitive means for monitoring tape tension in the present invention.

Tape tension sensor assemblies 52 adjust the speeds of the motors 48 and 50 as circumstances warrant. FIG. 5 schematically illustrates the operation of the tension sensor assembly 52 on the supply side dancer roller 46. The dancer roller 46 is mounted on a pivotal arm for movement in direction illustrated by arrows 53. A photosensor 54 is mounted on the inside wall of tape drum 10. A suitably chosen light source 56 is positioned between the photosensor 54 and the supply reel 16 such that the dancer roller 46 with the tape 14 looped over it passes between the photo sensor 54 and light source 56. If the supply reel 16 is rotating too slowly, the dancer roller 46 moves so as to increase the amount of light reaching the photosensor 54, causing the photosensor 54 to provide a signal to the supply reel motor 48 to increase its speed. When the supply motor reel is running slightly faster than needed, the dancer roller 46 moves so as to block light reaching the photosensor 54, and this then causes the photosensor 54 to provide a signal to the supply reel motor 48 to slow down, thereby permitting the spring-loaded dancer roller 46 to be biased to the other direction. In a similar system on the take-up side, an increase of light striking a photosensor will be detected which in turn generates a signal to the take-up reel motor 50 to slow down, while a decrease in light striking that photosensor will cause the take-up reel motor 50 to speed up.

As seen in FIG. 4, tape drum 10 has a cylindrical wall 70 supported on a disk-shaped plate 72. Affixed to the center of the plate 72 is a cylindrical center post 74 which extends upwardly from the plate 72 on the same side of the plate as the cylindrical wall 70 (the post 74 is within the tape drum 10). The center post 74 extends through the plate 72 and has an outer cylindrical portion 76 extending downwardly from the plate 72 (outside the tape drum 10). The center post 74 and outer portion 76 thereof are coaxially aligned with the rotational axis 32 of the tape drum 10.

The outer portion 76 is open at its outer end and has a bore 78 extending from that open end toward the plate 72. A mounting post 80 is receivable axially within the bore 78. A precision sleeve bearing 82 is fitted between the mounting post 80 and inner cylindrical surface of bore 78, with the bore of the bearing 82 defining the drum axis 32 and the length of bearing 82 being sufficient to limit wobbling of the outer portion 76 and tape drum 10 borne thereon during rotation of the tape drum 10 relative to the mounting post 80. The mounting post 80 is, in turn, fixedly mounted to the base 12 (not shown in FIG. 4). A thrust bearing 84 is secured in centering pits 86 and 88 on the outer portion 76 and mounting post 80, respectively, in order to support the weight of the drum assembly 30 on the mounting post 80.

In a preferred embodiment, a drive belt 89 operably connects the outer portion 76 and tape drum 10 borne thereon to drum drive motor 34. Slip rings and brushes (not shown) are mounted on and relative to the outer portion 76 in order to provide electrical contact to the rotating drum assembly 30 as necessary for the motors and sensors which are carried on and rotate with the drum assembly 30.

Referring again to FIG. 4, the take-up reel 18 is supported within the tape drum 10 on a take-up reel hub 90 which is rotatable with respect to the center post 74. The take-up reel hub 90 and take-up reel 18 supported thereon are rotatably driven by operable engagement of the take-up reel hub 90 and a gear 92, which in turn is rotated by take-up reel motor 50. Similarly, the supply reel 16 is supported upon a supply reel hub 94 for rotation about center post 74 and take-up reel hub 90. The supply reel hub 94 and supply reel 16 supported thereon are rotatably driven by operable engagement of the supply reel hub 94 and a gear 96, which in turn is rotated by supply reel motor 48. The take-up reel 18 is axially supported and separated from the supply reel 16 by annular collar 98. The gears 92 and 96 and motors 48 and 50 are all supported on the plate 72 on the tape drum 10. Spacers and bearings are provided as needed or appropriate between the relative rotating components about the center post 74. Not shown in FIG. 4 are advance capstan 40 and its associated pinch roller 41, rewind capstan 42 and its associated pinch roller 43, and the capstan drive motor(s), all of which are also supported on the plate 72 of the tape drum 10.

The dancer rollers 44 and 46 are mounted on dancer roller support arms positioned rotatably within the tape drum 10 about the center post 74 and between the take-up reel hub 90 and plate 72. Dancer roller 44 is rotatably mounted upon a first end 102 of roller arm 104, which is biased away from the opening 36 in the tape drum 10 by a coiled spring 106. One end of the spring 106 is secured to the first end 102 of the roller arm 104, while the second end thereof is secured to a post 108 extending upwardly from the plate 72 of the drum 10. Similarly, dancer roller 46 is rotatably mounted on a first end 112 of roller arm 114. Again, the dancer roller 46 is biased away from the opening 36 in the tape drum 10 by a coiled spring 116, one end of which is secured to the first end 112 of the roller arm 114, and the second end of which is fixed to a post 118 extending upwardly from the plate 72 of the tape drum 10. In the embodiment shown in FIGS. 3 and 4, each roller arm has a second end which extends past the circumference of the supply roller 16 and which has means for bearing suitable counterbalance weights 120 and 122. These weights are provided to counteract the centrifugal forces exerted on the roller arms 104 and 114 when the tape drum 10 is rotated.

Figure 6:
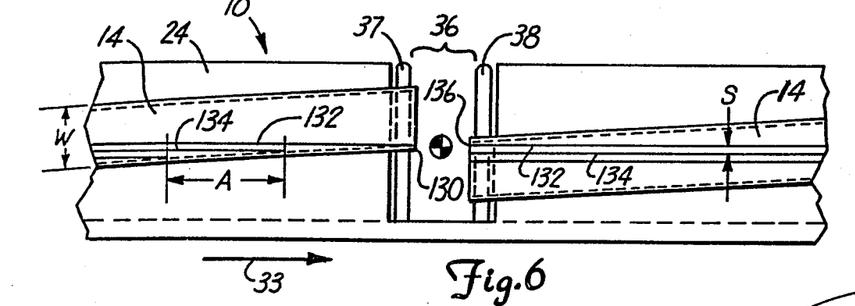
FIG. 6 (Sheet 5) is a representative illustration of the embodiment of the present invention seen in FIG. 1, showing portions of the tape and drum adjacent that area on the drum where the tape enters and exits the helical path on the drum.

As seen in FIG. 6, the starting point 130 for a given diagonal track 132 on the tape 14 for reading or recording on that track is on the tape drum 10 adjacent to opening 36 therein where the tape 14 emerges from inside the tape drum 10. Each track on the tape 14 (such as track 132) corresponds to the path 28 traced by the laser beam 22 (or, in the case of magnetic tape 14', the path traced by the magnetic head 21 along the tape 14'). During each rotation of the tape drum 10, the tape 14 moves slightly (in direction of arrow 33) relative to the surface 24 of the tape drum 10 as a consequence of operation of the advance capstan 40. Then, on the next rotation of the tape drum 10, the path traced by the laser beam 22 (or magnetic head 21) covers a new track 134, adjacent to the previous track 132, and will cover all subsequent tracks as long as the tape 14 continues to move relative to the tape drum 10 as the tape drum 10 is rotated. The amount of offset between adjacent tracks along the length of the tape 14 is a function of tape velocity relative to the tape drum 10.

Since the tape is read from outside the tape drum (by the laser beam or magnetic head), the information bearing surface of the tape is on that side of the tape which is not in contact with a surface of the tape drum. The amount of tape advance per drum revolution is approximated by the formula $A=(S*C/(W*25400)$, which is reasonably accurate when the ratio of tape width to drum circumference is greater than 1:20, where A is the linear advance of the tape, in inches, S is the desired separation between adjacent paths, in microns, C is the circumference of the cylindrical outer surface of the tape drum minus the length of the opening therein, in inches, and W is the width of the area of the tape to be recorded, in inches. In one embodiment of the present invention, where $S=2$ microns, $C=34.28$ inches, and $W=0.46$ inches (0.5 inch wide tape with 0.02 inch wide borders), the tape advance A would be about 0.006 inches per revolution of the tape drum. If the drum makes one revolution in 0.1 seconds, then the relative velocity of the tape with respect to the surface of the drum becomes (0.006)/(0.1), or 0.06 inches per second. The tape drum 10 is rotated at a very high rate of rotation relative to the stationary read/write assembly 20 (e.g., 900 rpm in a preferred embodiment).

To appreciate the advantage of the present invention, it must be remembered that in the prior art optical tape recorders where the optics were located within a rotating drum, the relative velocity of tape to drum was often greater than 34 inches per second, whereas the present invention provides a differential velocity between the tape and drum surface measured in fractions of an inch per second. The present invention thus provides significant improvements in tape handling techniques and integrity.

The helical wrap angle of the tape 14 on the cylindrical outer surface 24 of the tape drum 10 is preferably chosen to allow a slight overlap of the tape 14 if the tape were to be wrapped on the tape drum 10 for 360 degrees or more. As seen in FIG. 5, this overlap would occur but for the opening 36 in the tape drum 10. This overlap allows the laser beam 22 (or magnetic head 21) to first impinge upon the tape 14, for example, at a point spaced in from a lower edge of the tape 14 (at track starting point 130) and to thus trace a path (track 132) from that point diagonally across the tape 14. The track 132 ends at a point spaced in from an upper edge of the tape 14 adjacent the location at which the tape 14 first emerges from the interior of the tape drum 10 (track ending point 136). Restated, the total tape "overlap" is equivalent to the sum of the widths of the two unused edges of the tape 14, with the laser beam 22 (or magnetic head 21) vertically located at a position bisecting the "overlap."

In the embodiments of the present invention as seen in FIGS. 1-4, the tape 14 is unloaded from the tape supply reel 16, follows the helical path on the outer cylindrical surface 24 of the tape drum 10, and is loaded onto the take-up reel 18 as recording or playback proceeds. During this process (and also during tape rewinding), the tape packs wound on the reels remain concentric with the rotational axis 32 of the tape drum 10, and also the rotational axes of the reels. Thus, tape shuttling between supply and take-up reels does not unbalance the rotating tape drum 10 since the tape mass about the drum's rotational axis remains nearly constant. Because of the coaxial mounting of the tape drum 10, supply reel 16 and take-up reel 18, a dynamic balancing of the drum assembly 30 is achieved. It is not essential that the supply and take-up reels be coaxially mounted with the tape drum 10, however, counterbalancing may be required if such a coaxial arrangement is not provided.

In the embodiments of the present invention using optical tape, the read/write assembly 20 generates a focused laser beam 22 in a conventional manner. The requirements for such an optical system are well-known to those skilled in the art, and one arrangement may be preferred over another depending upon the characteristics of the information carrying surface of the tape 14 and other variables. An optical system designed to handle optical disks will function satisfactorily with optical tape with some minor modifications. Such an optical system is impartial insofar as the format of the surface it illuminates, but the focus and tracking detectors and servos must be reoriented in order to use an optical system designed for disks in connection with optical tape. In the case of optical tape, bearing radial runout produces a focus error and axial runout produces a tracking error, which is opposite of the disk case. For optical tape purposes, the final focusing lens for the laser beam moves radially for focus and axially for tracking purposes when a two-axis optical head is used.

In general terms, the optical read/write system 20 is provided with recording signals 150 (see FIG. 1) from some data source, and those signals are transmitted to the recording medium (tape 14) via the laser beam 22. The reactive surface of the tape 14 is altered in state by the laser beam 22 to record the data on the tape 14. In a playback mode, the optical read/write assembly 20 focuses a laser beam 22 of lesser power on the reactive surface of the tape 14 to detect the changes in state previously written on the reactive surface. The information detected is then amplified and converted into playback signals 152.

Similarly, the read/write system 20' for magnetic tape is provided with recording signals 150' (see FIG. 2) from some data source, and those signals are transmitted to a recording medium (tape 14') by one or more magnetic heads 21. The magnetic medium of the tape 14' is altered in state by operation of the magnetic head 21 to record the data on the tape 14'. In a playback mode, the magnetic head 21 detects the changes in state previously recorded on the magnetic reactive surface of the magnetic tape 14', and the information so detected is then amplified and converted into playback signals 152'.

In order to accurately monitor the position of the tape drum 10 as it rotates relative to the fixed read/write system 20, a tape drum position indicator 140 is mounted on the tape drum 10. As the tape drum 10 rotates, the indicator 140 is detected or read by a suitable sensor 142 mounted or supported exterior to the tape drum 10. The sensor 142 provides an appropriate signal, upon detection of the indicator 140, to indicate to the read/write system 20 when the start of recording or reading on a new track is permissable (e.g., when the opening 36 in the tape drum 10 is not passing by a laser beam 22 (a magnetic head, depending on the tape record medium)).

In the embodiments of the present invention as seen in FIGS. 1-4, the tape path configuration requires that the helical path around the tape drum 10 be less than 360 degrees. The small opening 36 which exists at the points of entry and exit of the tape 14 through the tape drum 10 produces a momentary signal loss to the read/write assembly 20 as the opening 36 rotates past the laser beam 22. This situation exists in other types of helical scan recorders (for example, in the "C format" video recorders used in the broadcast industry) and is typically handled by buffering data electronically through the opening data gap interval in order to place a continuous track on the tape for subsequent tracking during playback. The conventional approach to dealing with this tape drum opening is to include a FIFO (first-in-first-out) register 154 (see FIG. 1) in the read/write system 20 for time compression of data during recording. The FIFO register 154 manipulates a data stream of recording and playback signals provided to or received from the read/write system 20. A steady but accelerated data stream is recorded during the active portion of drum rotation, and recording is interrupted during the opening interval. The average data rate of the system matches the real time rate of the data source. The process is usually reversed during playback to restore the data rate to the average value and to fill in the data gap caused by the physical opening in the tape drum.

Figure 7:
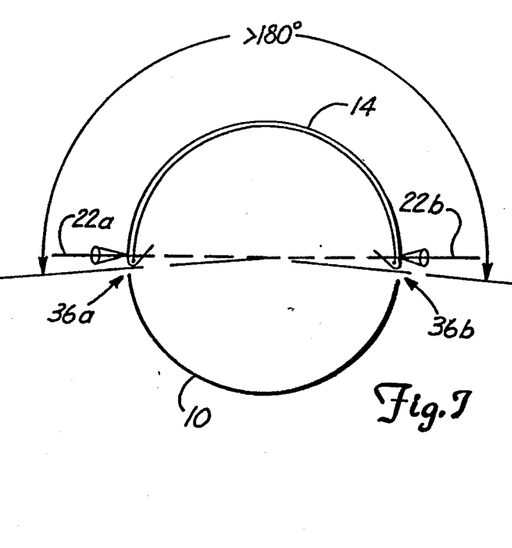
FIG. 7 (Sheet 5) is a schematic representation of a further embodiment of the invention of the present application, wherein two laser beams are focused on a rotating drum.

An alternative method to handle the data stream gap is illustrated by the embodiment of the invention seen in FIG. 7. In this case, the tape drum 10 has at least two openings therein, 36a and 36b. For optical tape, two laser beams are focused to impinge upon the tape 14 wound helically about the drum 10, the laser beams being illustrated in FIG. 7 as at 22a and 22b. In one embodiment, laser beams 22a and 22b are colinear, and located 180 degrees apart about the periphery of the tape drum 10. As before, the tape 14 is supplied from within the tape drum 10 via suitable tape supply means. The helical path on the outer cylindrical surface of the tape drum 10 is defined between the openings 36a and 36b, and is slightly greater than 180 degrees (preferably 182 degrees) about the perimeter of the tape drum 10, as seen in FIG. 7. As the tape drum 10 and tape 14 borne thereon rotate, the fixed position laser beams 22a and 22b and optical assemblies associated therewith read or write data continuously, so that when the tape 14 passes from one laser beam to the other, a short interval of data duplication is detected from or written on that portion of the tape length which exceeds 180 degrees.

This helical scanning technique is known, and has been employed in the VHS and Beta format consumer video recorders. During playback, a short interval will exist for each rotation of the tape drum 10 where signals will be coming from both laser beams 22a and 22b (when the drum 10 is positioned as seen in FIG. 7). The output from the optical assemblies of the recorder is switched from tracking one laser beam to the other in the middle of this interval, providing a continuous data stream out of the recorder. While FIG. 7 shows this technique for handling the gap in tape about the periphery of the tape drum using two laser beams, the same technique can be used for additional multiple laser beam arrangements. In such cases, the arc defined by the helical path around the cylindrical outer surface of the tape drum must be greater in degrees than the largest arc between adjacent laser beams. Since optical assemblies are relatively expensive and electronic buffering means (e.g., FIFO registers) are not, the near-360 degree tape wrap will generally be preferred because it results in a less expensive configuration and also one which is typically smaller.

Of course, the approach to handling the data stream gap illustrated in FIG. 7 is equally applicable when magnetic tape is used. In place of the laser beams 22a and 22b, magnetic heads are substituted. For example, in FIG. 2 four magnetic heads 21 are seen. Magnetic heads are not as expensive as optical assemblies and thus it may be simpler to use multiple magnetic heads in the read/write system for a magnetic tape than it would be to use multiple laser beams in the read/write system for optical tape.

As described above, the present invention reads or writes data in a single track on the tape 14. One limitation in a single track system is that data transfer rates are limited by the velocity that can be achieved between the recording medium surface and the energy source that is doing the recording or reading. In optical recording systems, medium to transducer (laser beam) velocities greater than 1000 inches per second have been difficult to obtain. In recorder system configurations where multiple transducers are rotating and are recording several tracks simultaneously, physical alignment of the transducers to maintain track spacing is difficult. In addition, electrical connections to multiple transducers in such arrangements requires complex brush and ring assemblies or rotating transformer assemblies. For optical tape, a simple means for alleviating these difficulties is to use laser diode arrays focused on the tape instead of a single laser beam. Such arrays illuminate more than one track at a time for reading and writing purposes.

Figure 8:
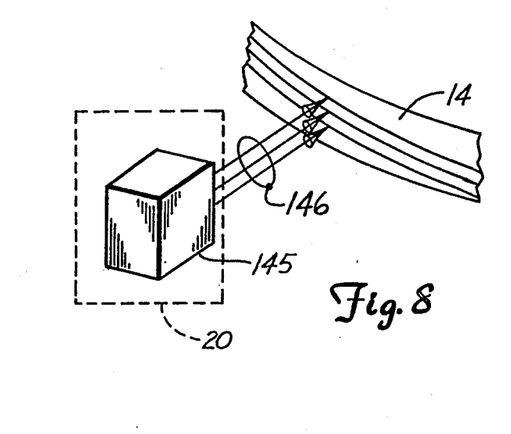
FIG. 8 (Sheet 5) is a schematic illustration showing multiple laser beams in connection with the helical scanning arrangement of the present invention.
Figure 9:
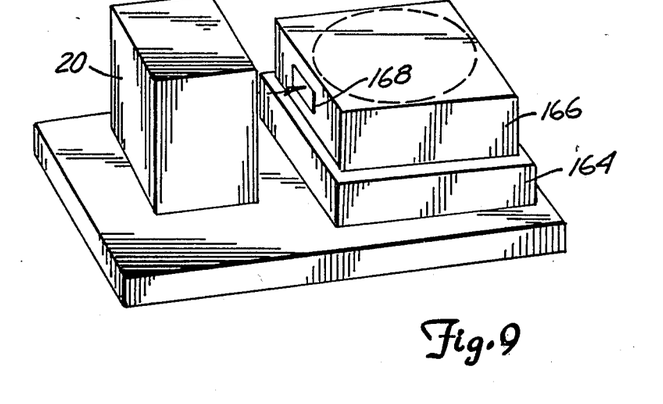
FIG. 9 (Sheet 6) is a schematic isometric representation of an embodiment of the present invention wherein the rotating drum is housed within a cartridge.

As seen schematically in FIG. 8, the optical read/write assembly 20 includes a laser diode array 145 which, in connection with a focusing lens 146, impinges a plurality (three are shown) of laser beams onto the outer reactive surface of tape 14. As seen, each of the three laser beams illuminates a separate track on the tape 14, thus increasing the data transfer rate between the tape and the optical read/write assembly 20 threefold. Because the present invention employs stationary optics relative to the rotating drum 10, the use of laser diode arrays adds no mechanical complexity to the system, as opposed to systems employing rotating optics.

As mentioned above, one tape medium suited for use with the present invention is magneto-optic tape. Magneto-optic recording requires a tracking detector which can develop a playback signal not from physical features, but from magnetically recorded features which influence the polarization of reflected light. When using optical tape of the type commonly referred to as magneto-optic tape, a weak (approximately 300 Oe) magnetic field must be supplied perpendicular to the tape surface and congruent with the point or area where the laser beam is focused in order to control the polarity of magnetization of the tape during writing and erasure of information on the tape.

In magneto-optic disk systems, the magnetic field is ordinarily applied from the pole of an electromagnet behind the disk. The magnetic field through the electromagnet is reversed for recording and erasure. For the helical scan optical tape system of the present invention, the magnetic field required for magneto-optic recording and erasing is preferably furnished by a doughnut-shaped electro-magnet 155 positioned outside and adjacent to the tape drum 10, and positioned between the cylindrical outer surface 24 of the tape drum 10 and a focal lens 156 of the optical read/write assembly 20, as shown schematically in FIG. 2. The electromagnet 155 must have an optical opening or transparent area 157 through which the laser beam can pass. As such, the magnet can be constructed having an air core, a ferromagnetic core, or a permanent magnet core. Various techniques of fabricating each of the core types in a very thin configuration are well known in the art.

In the embodiments of FIGS. 1–4, a non-rotating protective cover 160 encloses the tape drum assembly 30, as seen in phantom in FIG. 4. The cover 160 has side openings only for the tape impinging components of the read/write systems (laser beams or magnetic heads) and photosensor 142 in order to keep the interior of the tape drum free from debris, dust, and other environmental pollutants.

In a preferred embodiment, drum assembly 30 (including the tape 14, drum 10 and the aforementioned tape support and advance means) is in cartridge form. In this arrangement, shown schematically in FIG. 9, the read/write assembly 20 is fixed in place relative to a tape drum drive means 164. A tape drum cartridge 166 (bearing the rotatable tape drum with tape helically wound thereon, tape supply means and tape advance means) is operably engagable with the tape drum drive means 164 in order to rotate the tape drum therein and provide electrical connections for the motors and sensors borne by the cartridge 166. In the case of an optical system, the tape, which is helically wrapped about the tape drum inside the cartridge 166, is optically detectable via a suitable opening 168 in the cartridge 166 (for a magnetic tape system, means are provided to permit the magnetic head(s) to be adjacent to or in engagement with the magnetic tape wound helically around the tape drum). When such a cartridge 166 is used, or even when the drum assembly 30 is used as in FIG. 4, the drum and tape thereon (and tape therein) are easily removed from the drive means 164 (or drive belt 89, as seen in the FIG. 4 embodiment). By this means, the tape never needs to be threaded onto its tape path and would always be held within an enclosed container. In addition, slight variations in the tape path from drum to drum would be inconsequential because both tape and drum would always be interchanged together. This arrangement thus permits easy interchangeability by different tapes and tape drum assemblies, thus obviating the need for replacing the tape supply and take-up reels when a different tape is to be read or recorded upon.

In a further embodiment of the present invention, the tape supply and take-up reels (plus their associated drive motors and controls) are completely eliminated by employing an endless loop of tape within and about the tape drum. Endless loop tape arrangements are used in certain recording applications, such as flight recorders on aircrafts, where the recording system records data continuously but does not need to store large quantities of data. Old data is automatically erased and replaced with new data each time the tape begins another term in the recorder.

Figure 10:
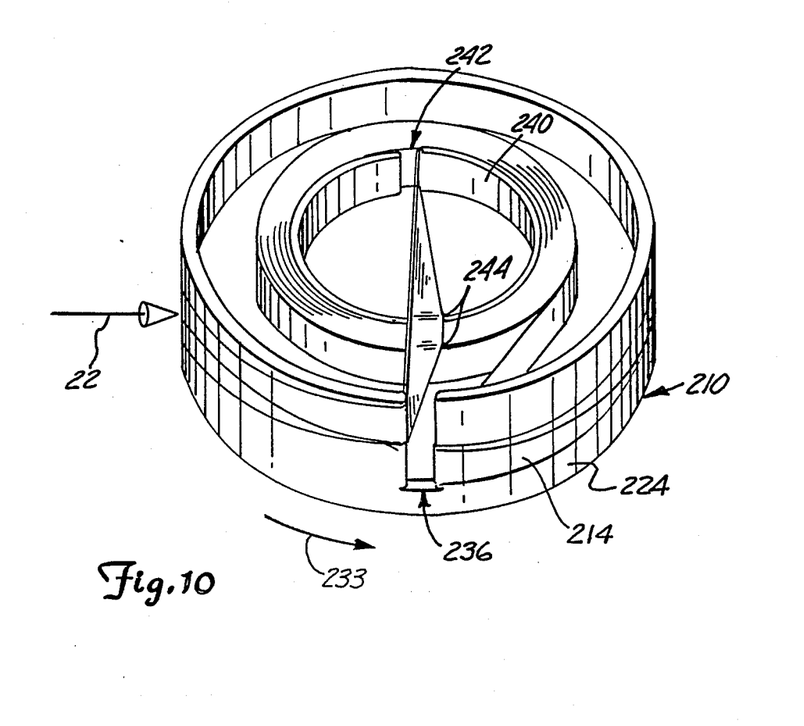
FIG. 10 (Sheet 6) is a schematic pictorial view of a further embodiment of the present invention employing an endless loop of tape.

An endless loop drum and tape arrangement for the present invention is schematically illustrated in FIG. 10. A rotatable tape drum 210 has tape 214 wrapped in a near-360 degree helical path about the outer cylinder surface 224 of the tape drum 210. Tape 214 enters and exits the interior of the tape drum 210 via an opening or slot 236 therein, and the tape 214 is advanced about the tape drum 210 in direction indicated by arrow 233 (the drum is also rotated in that direction). A hollow, cylindrically shaped tape core 240 is fixedly mounted within the interior of the tape drum 210, preferably coaxially with the rotational axis of the tape drum 210. The outermost wrap of tape 214 on the core 240 is directed through one side of the opening 236, onto the helical path and around the tape drum 210. After completing its circuit of the helical path, the tape 214 enters the tape drum 210 through the other side of the opening 236. Adjacent the opening 236 and within the tape drum 210, the tape 214 is then twisted (via engagement with guide means not shown) to an approximately 90 degree orientation relative to the tape wound about the core 240, as seen by that portion of the tape at 244. After passing above the core 240 and tape 214 wound thereon, the tape 214 is directed into the interior of the core 240, at which point the tape 214 is again twisted (via suitable guide means not shown) approximately 90 degrees to pass through an opening or slot 242 in the core 240. The tape 214 is then directed around the core 240, immediately becoming the innermost wrap of tape on the core 240, and the tape 214 is aligned to again present the same tape surface outwardly when the tape 214 is directed onto the helical path from the core 240. For use with an optical tape medium, an optical system using a laser beam 22 as described above scans the tape 214 on its helical path as the tape drum 210 is rotated. For use with magnetic tape, a magnetic head scans the tape on its helical path as the tape drum is rotated.

The use of an endless loop tape configuration requires that each wrap or turn of the tape about the core 240 move at a different rotational velocity because the linear velocity of the tape is constant throughout the wrapped pack of tape. In other words, each wrap or turn of the tape must slip against its adjacent wraps or turns of tape. A tape with lubricated surfaces is used to facilitate slippage of adjacent layers of tape within the tape pack wrapped about core 240. In such an endless loop drum assembly configuration, a capstan provides the total moving force for the tape relative to the tape drum. This embodiment of the present invention would be particularly suitable for use in cartridge form, because of its simplicity and because of the lack of necessity for tape handling (i.e., no reel and tape path threading). Tape twisting and handling techniques in endless loop arrangements are well known, as exemplified by U.S. Pat. No. 4,367,850.

Another version of the present invention which is particularly suited for use in cartridge form has a single strip of tape, helically wrapped about a rotatable tape drum from end to end. Because of the high areal density of optical tape ($2 \times 10^8$ bits per square inch), a comparatively short length of such tape (one helical wrap around the tape drum) is able to store large quantities of data. In such an application, the diagonal tracks across the reactive surface of the tape would necessarily vary in length, and since the tape does not move relative to the tape drum, reading all of the tracks would require movement of the laser beam relative to the tape from edge to edge (or the use of multiple beams for reading different tracks). Of course, a single strip of helically wrapped magnetic tape can also be used, although the lower data storage capacity of magnetic tape may make such an arrangement inefficient and less commercially viable.

As noted above, when magnetic tape is used as the tape record medium, some revisions are necessary in order to practice the present invention. In essence, however, the only differences involve the tape itself, the means for reading or writing on the tape (magnetic heads instead of laser beams) and, in the case of contact magnetic heads, a modification to the outer cylindrical surface of the rotating drum. Otherwise, the details of the apparatus seen in FIG. 2 for magnetic tape are the same as that shown in FIGS. 1 and 3-7, 9 and 10 for optical tape purposes.

The magnetic head 21 is mounted on a suitable mounting surface (flat panel 23) and aligned essentially perpendicular to the cylindrical outer surface 24' of the tape drum 10'. For contact heads, in order to make the necessary magnetic realignment of the magnetic media on the tape thereon, an appropriate physical contact between tape 14' and head 21 is necessary. To facilitate this, a shallow groove 25 is formed in the outer cylindrical surface 24' of the tape drum 10' opposite the poles 27 of a contact magnetic head 21A (see FIG. 11). This groove 25 permits the poles 27 of the contact magnetic head 21A to press the magnetic tape 14' radially inwardly toward the central axis of the tape drum 10', so that a portion of the tape 14' is below the cylindrical outer surface 24' of the tape drum 10'. This permits the necessary "tape penetration" by the contact magnetic head 21A in order to achieve a small wrap of tape 14' around the contours of the poles 27 of the contact magnetic head 21A. This approach of obtaining head contact is employed in the "quadraplex" video recorder format and is well known. Other means of allowing the poles of a contact magnetic head to "penetrate" the tape wound on the helical path around the drum are also possible, such as coating the drum with a layer of resilient material along the path.

Figure 12:
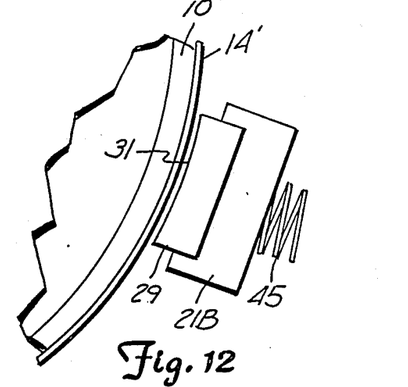
FIG. 12 (Sheet 2) is an enlarged, schematic top view of one of the flying magnetic heads and the drum adjacent thereto.

As mentioned above, flying heads can be used with magnetic tape in practicing the present invention. In this case, each magnetic head is aligned adjacent the tape on the helical path and aerodynamically supported to "fly" over the surface of the tape, in the same manner as the magnetic heads for rigid disks operate. As opposed to the flat flying head configuration employed with rigid magnetic disks, the flying heads of the present invention have contoured poles which fit precisely the curvature of the tape drum and tape helically wound thereon. This relationship is shown in FIG. 12, where the poles 29 of a flying magnetic head 21B are shown with tape scanning surface 31 contoured to mate with the outer cylindrical surface 24' of the tape drum 10', and thereby conform to the surface of the magnetic tape 14' on the helical path.

With sufficient rotational drum speed, the flying heads are supported by a thin layer of air which flows between the magnetic tape 14' and scanning surfaces 31 as a consequence of the precise shaping of the poles 29 of the flying head 21B. As is the case with magnetic rigid disk flying heads, each drum head 21B is mounted on suitable springs means (illustrated schematically as at 45) which give each flying head a degree of freedom to move radially with respect to the tape drum, but which prevent even small movement in the axial direction. Thus, each flying head is pressed slightly against the cushion of air which separates it from the tape surface, but each maintains precise tracking position. There is no actual contact between the magnetic tape and flying head, and thus the groove in the outer cylindrical surface of the drum is not required for data transfer purposes. When the rotational drum speed is insufficient to enable spontaneous aerodynamics suspension of the flying head, air can be separately supplied to separate the spring loaded flying heads from the tape surface by pumping air at low flow volume into a small vent hole at the tip of the pole 29 of the flying head 21B.

Air supported, non-contact methods of magnetic head suspension do not allow contact of the magnetic head with the magnetic tape surface. These flying heads or non-contact methods have the advantages of reducing friction and loading on the tape drum and of preventing wear on both the operative surfaces of the magnetic head 21B and the magnetic tape 14' itself, but have the disadvantage of reducing the linear recording density obtainable in magnetic recording. For the same reason that rigid magnetic disks do not achieve linear recording density equal to that of magnetic tape (the effect is termed "spacing loss") flying heads do not obtain the linear recording density of contact heads. The election of contact heads versus flying heads depends upon the application of the helical scan tape record system.

Figure 11:
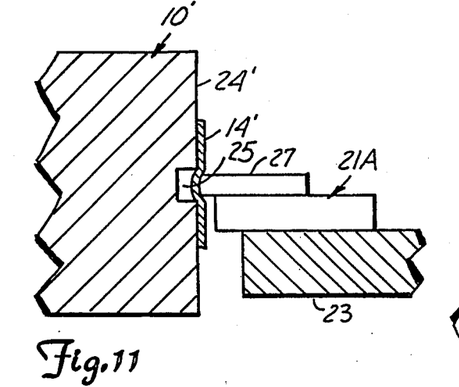
FIG. 11 (Sheet 2) is an enlarged partial sectional view of one of the contact magnetic heads and the drum adjacent thereto.

In general, data transfer rates from magnetic tape can be vastly improved by employing a plurality of magnetic heads 21 (see FIG. 2). Each of these magnetic 21 heads is generally fixedly mounted relative to the rotating tape drum 10', for example to the mounting panel 23. For contact heads, the heads 21 are aligned in a common plane which is perpendicular to the central axis of the tape drum 10', and the heads 21 are aligned coplaner with the groove 25 in the cylindrical outer surface 24' of the tape drum 10'. The necessary "tape penetration" is thus accomplished without damaging either the tape surface or the head. In other words, as seen in FIG. 11, the magnetic head 21A lightly forces the magnetic tape 14' into the groove 25, achieving a small wrap of tape around the operative contours of the poles 27 of the magnetic head 21A.

In the embodiment shown in FIG. 2, the magnetic tape 14' contained within and rotated with the tape drum 10' is brought through the opening 36' in the wall of the drum 10', wrapped one full helical turn around the outer cylindrical surface 24' of the drum 10', then returned to the interior of the drum 10'. The magnetic tape 14' moves slowly around the tape drum 10' as the drum 10' rotates rapidly and achieves a high linear velocity between the magnetic head 21 and the magnetic tape 14'.

In this configuration, a magnetic tape recorder has several principal advantages over prior helical magnetic tape recording systems. First of all, the magnetic heads themselves do not rotate; therefore, electrical contact can be made by hard wiring to the heads, instead of having to wire the heads through a rotational configuration. Secondly, by using a relatively large diameter tape drum, a large number of magnetic heads can be spaced around the perimeter of the tape drum. It is contemplated that forty or more magnetic heads can be accommodated without crowding, providing a system data transfer rate which is the single track rate multiplied by the number of heads. Data rates of several hundred megabits per second can thus be achieved.

For example, employing a tape drum with a circumference of thirty inches and using forty heads (each spaced 0.75 inches apart around the drum's circumference), rotating the drum at 450 RPM (7.5 RPS) presents 225 inches per second of tape to each head. The transfer rate per track, assuming a magnetic tape with a storage density of 50,000 bits per inch and rotating at 225 IPS, results in a data transfer rate of 11.25 megabits per second, and this is for one head only. Using forty heads results in a system data transfer rate of 450 megabits per second.

A third advantage over prior helical magnetic tape recording systems is that because the tape is wrapped helically around the drum, the track on the tape (and the tape itself) moves vertically or axially as the drum rotates relative to a stationary magnetic head. In a preferred embodiment such as shown in FIG. 2, multiple magnetic heads are used and they are based around the circumference of the tape drum in a common plane. This feature simplifies head mounting and alignment because all heads can be attached to a single plate of machined precision which surrounds the drum. This feature also facilitates rapid replacement and repair of the recording apparatus.

Fourth, as was previously discussed, the tape drum containing the tape can also serve as a tape container or self-contained cartridge, and it can be interchanged between different tape drum drives and read/write systems along with the tape. The tape can be contained on coaxial reels (as illustrated in FIG. 2), or it can be configured as an endless loop (see FIG. 10) in order to eliminate the reels, motors and controls required for tape handling illustrated in FIG. 4.

Although the present invention has been described with reference to preferred embodiments, workers skilled in the art will recognize that changes may be made in form and detail without departing from the spirit and scope of the invention.

What is claimed is:

1. An apparatus for retrieving information on a tape record medium which comprises:
    a drum having a cylindrical outer surface which has relatively narrow longitudinal opening therethrough with the drum being rotatable about a central longitudinal axis thereof;
    a supply reel and a take-up reel for the tape record medium, both reels carried by the drum and each record being rotatably mounted along the central axis of the drum;
    a path for the tape record medium from the supply reel within the drum which extends through the opening out of the drum, along a helical path around the cylindrical outer surface of the drum, through the opening back into the drum and to the take-up reel;
    means on the drum for advancing the tape record medium along the path;
    means on the drum for placing tension on the tape record medium along the path, with the tension placing means including at least one rotatable roller which is biased into engagement with the tape record medium and which is aligned on an axis other than the central axis of the drum and a counterweight opposed from the roller across the central axis of the drum;
    means for rotating the drum about the central axis of the drum; and
    means for detecting and retrieving information on the tape record medium as the tape record medium is rotated and advanced along the helical path, the detecting and retrieving means being fixed in position relative to the rotatable drum.

2. The apparatus of claim 1 wherein the helical path extends in an arc less than 360 degrees about the cylindrical outer surface of the drum thereby creating a break in the tape record medium and information thereon presented to the detecting and retrieving means during each rotation of the drum.

3. The apparatus of claim 2 and further comprising:
    buffer means for accommodating the information break presented to the detecting and retrieving means during each revolution of the drum and for generating a relatively constant and uninterrupted stream of output signals based on the information detected and retrieved.

4. The apparatus of claim 1, and further comprising:
    sensor means for determining the rotational position of the drum relative to the detecting and retrieving means.

5. The apparatus of claim 1 wherein the drum, supply and take-up reels, tape advancing means and tape tension placing means comprise a tape drum assembly which as a unit is selectively disengagable from the rotating means.

6. The apparatus of claim 1 wherein the tape record medium is formed as an endless loop of tape.

7. The apparatus of claim 6 wherein the supply reel and take-up reel are combined as a single reel.

8. The apparatus of claim 1 wherein the detecting and retrieving means has a plurality of tape reading devices for detecting and retrieving information on only one side of the tape record medium, with the devices spaced apart around the cylindrical outer surface of the drum.

9. The apparatus of claim 8 wherein the tape reading devices are spaced apart in generally equal arcs around the cylindrical outer surface of the drum.

10. The apparatus of claim 9 wherein the helical path on the cylindrical outer surface of the drum extends about the drum in an arc greater in degrees than each of the arcs between adjacent tape reading devices.

11. The apparatus of claim 8 wherein the tape reading devices are all aligned on a plane which is perpendicular to the central axis.

12. The apparatus of claim 1 wherein the tape record medium is magnetic tape, and wherein the detecting and retrieving means includes a magnetic head.

13. The apparatus of claim 12, and further comprising:
means for permitting the magnetic head to press the magnetic tape radially toward the central axis of the drum.

14. The apparatus of claim 13 wherein the means for permitting includes a groove formed around the cylindrical outer surface of the drum, with the groove extending in a plane perpendicular to the central axis of the drum and aligned within the helical path.

15. The apparatus of claim 14 wherein the detecting and retrieving means includes a plurality of magnetic heads in contact with only one side of the magnetic tape, wherein all the magnetic heads are aligned in a common plane which is perpendicular to the central axis of the drum and coplanar with the groove.

16. The apparatus of claim 15 wherein the magnetic heads are all aligned in a common plane which is perpendicular to the central axis of the drum.

17. The apparatus of claim 12 wherein the magnetic head has a non-contact tape scanning surface which is concavely contoured to correspond to the curvature of the cylindrical outer surface of the drum.

18. The apparatus of claim 12 wherein the detecting and retrieving means includes a plurality of magnetic heads.

19. The apparatus of claim 1 wherein the means for placing tension includes a roller support arm pivotally mounted about the central axis for each roller, the arm having its roller rotatably mounted adjacent one end of the arm and having one of the counterweights mounted on the other end thereof on an opposite side of the central axis, to counterbalance the roller during rotation of the drum.

20. The apparatus of claim 19 and further comprising: means for controlling the rate of advance of the tape record medium by the tape record medium advancing means dependent upon the position of the roller.

21. The apparatus of claim 20 wherein the controlling means includes a light source and a photosensor, both carried within the drum, with the roller being disposed on its roller support arm generally between the light source and photosensor so that movement of the roller affects the amount of light from the light source detected by the photosensor.

22. The apparatus of claim 1 wherein the axis for each roller is tilted with respect to the central axis of the drum to assist in aligning the tape record medium along the helical path.

23. The apparatus of claim 22, and further comprising:
a roller guide rotatably mounted to the drum on each side of the opening in the cylindrical outer surface of the drum to assist in aligning the tape record medium along the helical path.

24. The apparatus of claim 23 wherein each roller guide rotates on an axis which is tilted with respect to the central axis of the drum to assist in aligning the tape record medium along the helical path.

25. The apparatus of claim 1 wherein the means for advancing includes a driven capstan.

26. The apparatus of claim 1 wherein the tape record medium is optical tape, and wherein the detecting and retrieving means includes at least one beam of radiant energy focused on the optical tape.

27. The apparatus of claim 26 wherein the optical tape is magneto-optic tape and wherein the beam of radiant energy focused on the tape is a laser beam, and further comprising:
means for creating a magnetic field congruent with that area on the magneto-optic tape where the laser beam is focused.

28. The apparatus of claim 27 wherein the magnetic field creating means is mounted adjacent to the cylindrical outer surface of the drum and has optical aperture means therein for permitting passage of the laser beam therethrough.

29. An apparatus for recording and retrieving information on a tape record medium which comprises:
a drum having a cylindrical outer surface which has a relatively narrow longitudinal opening therethrough, with the drum being rotatable about a longitudinal central axis thereof;
a supply reel and a take-up reel for the tape record medium, both reels carried by the drum and each reel being rotatably mounted along the central axis of the drum;
a path for the tape record medium from the supply reel within the drum which extends through the opening out of the drum, along a helical path around the cylindrical outer surface of the drum, through the opening back into the drum and to the take-up reel;
means on the drum for advancing the tape record medium along the helical path;
means on the drum for placing tension on the tape record medium along the helical path, with the tension placing means including at least one rotatable roller which is biased into engagement with the tape record medium and which is aligned on an axis other than the central axis of the drum and a counterweight opposed from the roller across the central axis of the drum;
means for rotating the drum about the central axis of the drum;
means for detecting and retrieving information on the tape record medium as the tape record medium is rotated and advanced along the helical path, with the detecting and retrieving means being fixed in position relative to the rotatable drum; and
means for recording information on the tape record medium as the tape record medium is advanced along the helical path, with the recording means being fixed in position relative to the rotatable drum.

30. An apparatus for retrieving information from magnetic tape which comprises:
a drum having a generally cylindrical outer surface and being rotatable about a central axis, with the drum having an annular groove in its generally cylindrical outer surface and with the groove extending in a plane perpendicular to the central axis of the drum;
tape supply means for supplying magnetic tape wound on a helical path on and about the generally cylindrical outer surface of the drum, the magnetic tape covering the annular groove;

magnetic tape advancing means for advancing the magnetic tape along the helical path;

rotating means for rotating the drum, the magnetic tape wound thereon and the magnetic tape supply means about the central axis; and detecting and retrieving means for detecting and retrieving information on the magnetic tape as the magnetic tape is rotated and advanced along the helical path, the detecting and retrieving means being fixed in position relative to the drum and including at least one magnetic head on contact with the magnetic tape opposite the annular groove.

31. The apparatus of claim 30 wherein the detecting and retrieving means includes a plurality of magnetic heads in contact with that side of the magnetic tape which is opposite the annular groove.

32. The apparatus of claim 31 wherein each of the magnetic heads is mounted on a mounting plate in a coplanar arrangement, with the mounting plate being disposed about the generally cylindrical outer surface of the drum.

33. An apparatus for recording and retrieving information on magnetic tape which comprises:

a drum having a generally cylindrical outer surface and being rotatable about a central axis, with the drum having an annular groove in its generally cylindrical outer surface and with the groove extending in a plane perpendicular to the central axis;

tape supply means for supplying magnetic tape wound on a helical path on and about the generally cylindrical outer surface of the drum so that the magnetic tape covers the annular groove;

magnetic tape advancing means for advancing the magnetic tape along the helical path;

rotating means for rotating the drum, the magnetic tape wound thereon and the magnetic tape supply means about the central axis;

detecting and retrieving means for detecting and retrieving information on the magnetic tape as the magnetic tape is rotated and advanced along the helical path, with the detecting and retrieving means being fixed in position relative to the drum and including at least one magnetic head in contact with the magnetic tape opposite the annular groove; and means for recording information on the magnetic tape as the magnetic tape is rotated and advanced along the helical path, with the recording means being fixed in position relative to the drum and including at least one magnetic head in contact with the magnetic tape opposite the annular groove.

* * * * *

UNITED STATES PATENT AND TRADEMARK OFFICE
CERTIFICATE OF CORRECTION

PATENT NO. : 4,939,715

DATED : July 3, 1990

INVENTOR(S) : Peter J. Vogelgesang et al.

It is certified that error appears in the above-identified patent and that said Letters Patent is hereby corrected as shown below:

On the title page:

In the References Cited Section, under U.S. PATENT DOCUMENTS, add the following:

| | | | |
|---|---|---|---|
| 2,908,769 | 10/1959 | Fonda | 179/100.2 |
| 3,042,331 | 7/1962 | Bierman | 242/55.13 |
| 3,189,289 | 6/1965 | Maxey | 242/55.11 |
| 3,430,879 | 3/1969 | Boyer | 242/55.12 |
| 3,495,047 | 2/1970 | Atsumi et al. | 179/100.2 |
| 3,571,500 | 3/1971 | Nassimbene | 178/6.6 |
| 3,677,494 | 7/1972 | Protas | 242/194 |
| 4,321,634 | 3/1982 | Lehureau | 360/70 |
| 4,321,637 | 3/1982 | Yamashita et al. | 360/93 |
| 4,388,659 | 6/1983 | Lemke | 360/90 |
| 4,692,822 | 9/1987 | Kabacinski | 360/84 |

In the References Cited Section, under FOREIGN PATENT DOCUMENTS, add the following:

0654956      3/1979      Soviet Union

In the References Cited Section, under OTHER PUBLICATIONS, insert the following:

Barnard et al., "Tape Scanning Device", p. 40, IBM Technical Disclosure Bulletin, May 1962

UNITED STATES PATENT AND TRADEMARK OFFICE
CERTIFICATE OF CORRECTION

PATENT NO. : 4,939,715

DATED : July 3, 1990

INVENTOR(S) : Peter J. Vogelgesang et al.

It is certified that error appears in the above-identified patent and that said Letters Patent is hereby corrected as shown below:

In the References Cited Section, under OTHER PUBLICATIONS, line 1, delete "IBM Tech.Bell", insert --IBM Tech. Bull--

Col. 21, line 13, delete "head on", insert --head in--

Signed and Sealed this

Second Day of July, 1991

*Attest:*

HARRY F. MANBECK, JR.

*Attesting Officer*      *Commissioner of Patents and Trademarks*